Dec. 22, 1942.  B. CARSON  2,306,014
ANIMAL TOILET
Filed Oct. 16, 1941
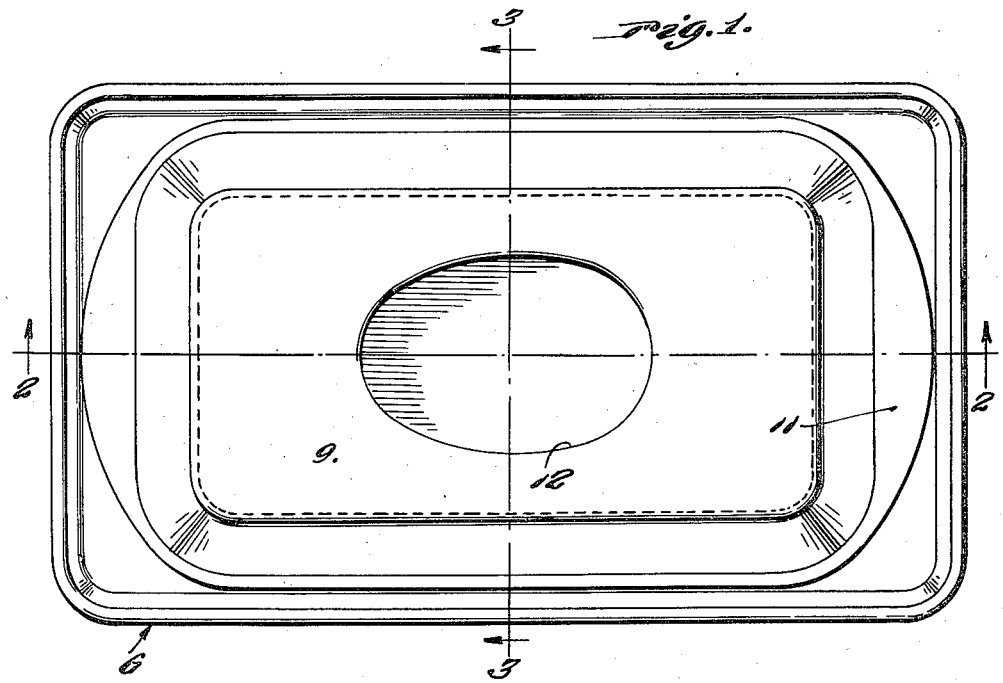
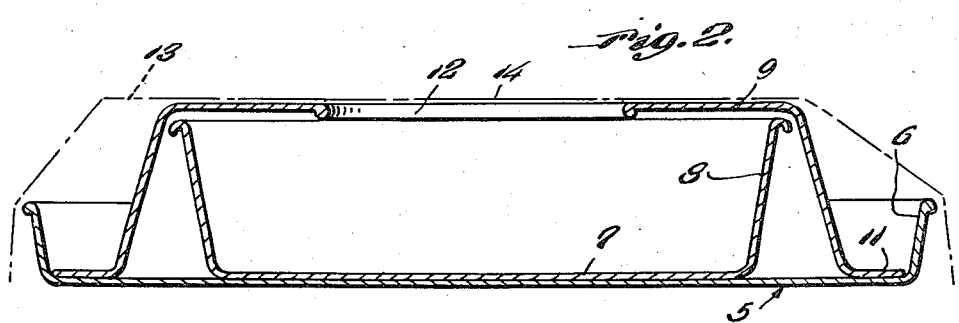
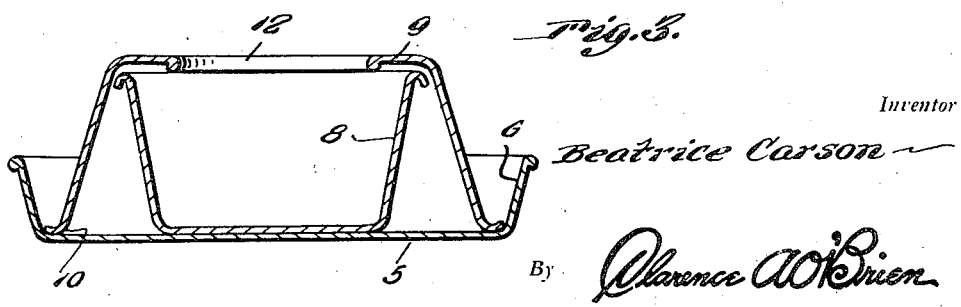
Inventor
Beatrice Carson
By Clarence A. O'Brien
Attorney Patented Dec. 22, 1942

2,306,014

UNITED STATES PATENT OFFICE 2,306,014

ANIMAL TOILET

Beatrice Carson, Washington, D. C.

Application October 16, 1941, Serial No. 415,324

1 Claim. (Cl. 119—1)

The present invention relates to new and useful improvements in portable toilets for animals, particularly cats, and has for its primary object to provide a device of this character which the animal may be trained to use in the home.

An important object of the invention is to provide a device of this character of a portable nature, which may be easily and conveniently carried by a person while traveling so that toilet facilities may be available for the animal at all times.

A further object is to provide a toilet of simple and practical construction, which may be conveniently cleaned, also relatively inexpensive to manufacture and otherwise well adapted for the purposes for which the same is intended.

Other objects and advantages reside in the details of construction and more fully hereinafter described and claimed, reference being had to the accompanying drawing forming part thereof, wherein like numerals refer to like parts throughout and in which:

Figure 1 is a top plan view,

Figure 2 is a longitudinal sectional view taken on a line 2—2 of Figure 1, and

Figure 3 is a transverse sectional view taken on a line 3—3 of Figure 1.

Referring now to the drawing in detail the numeral 5 designates the base of the toilet which is in the form of a tray or shallow pan of suitable non-rusting material and having the upstanding walls 6. Resting loosely on the base is a pan 7 constituting a receptacle and having walls 8 rising above the walls 6 of the base.

A cover 9 in the form of a pan is inverted over the receptacle with its edges 10 resting on the base 5. The side edges of the cover fit substantially close against the side walls of the base while extensions 11 are formed on the end edges of the cover for closely fitting against the end walls of the base, to thus retain the cover against sliding or shifting movement while the animal is using the device.

An opening 12 is formed in the cover 9 preferably of oval shape, so that the animal may climb on top of the cover and deposit the excretions through the opening into the receptacle. The edges of the opening are rolled inwardly to prevent injury to the animal. The edges of the cover together with the extensions 11 space the walls of the cover from the walls of the base to provide a trough therebetween into which excretions from the top of the cover may be drained.

It is a common practice to train cats and other animals to drop their excretions on a sheet of newspaper placed on the floor, and in order to remove any timidity on the part of the animal in using the present invention, the same may be covered with the newspaper as indicated at 13 and provided with the opening 14 therein in registry with the opening 12.

The several parts may be easily separated for conveniently cleaning the same.

It is believed the details of construction, operation and manner of use of the device will be readily understood from the foregoing without further detailed explanation.

Having described the invention, what is claimed as new is:

A toilet appliance adapted for use by animals and comprising an outer pan, an inner pan supported on the outer pan, and a cover for the inner pan having an opening therein said cover having its lower edges resting on the outer pan and projecting outwardly into engagement with the walls of the outer pan to prevent horizontal movement of the cover on said outer pan, said outwardly projecting edges of the cover spacing the walls of the cover from the walls of the outer pan to provide a collection trough surrounding the cover.

BEATRICE CARSON.